United States Patent
Shibayama et al.

(10) Patent No.: US 9,949,069 B2
(45) Date of Patent: Apr. 17, 2018

(54) POPULATION ESTIMATION APPARATUS, PROGRAM AND POPULATION ESTIMATION METHOD

(71) Applicant: AGOOP Corp., Tokyo (JP)

(72) Inventors: Kazuhisa Shibayama, Tokyo (JP); Takashi Umakoshi, Tokyo (JP); Hirofusa Watamori, Tokyo (JP); Yutaka Yamada, Tokyo (JP)

(73) Assignee: AGOOP Corp., Tokyo (JP)

( * ) Notice: Subject to any disclaimer, the term of this patent is extended or adjusted under 35 U.S.C. 154(b) by 0 days.

(21) Appl. No.: 15/494,552

(22) Filed: Apr. 24, 2017

(65) Prior Publication Data

US 2017/0230789 A1 Aug. 10, 2017

Related U.S. Application Data

(63) Continuation of application No. PCT/JP2014/078415, filed on Oct. 24, 2014.

(51) Int. Cl.
*H04W 24/00* (2009.01)
*H04W 4/02* (2018.01)
(Continued)

(52) U.S. Cl.
CPC ............ *H04W 4/02* (2013.01); *G06N 5/04* (2013.01); *G06Q 30/0203* (2013.01); *G06Q 50/26* (2013.01)

(58) Field of Classification Search
CPC ....... H04W 4/02; H04W 8/245; H04W 64/00; H04M 1/72519; G06N 5/04; G06Q 30/0203
(Continued)

(56) References Cited

U.S. PATENT DOCUMENTS

2010/0115926 A1* 5/2010 Nagaoka ............ B01D 53/9459
60/286
2012/0094686 A1 4/2012 Suzuki et al.
(Continued)

FOREIGN PATENT DOCUMENTS

JP 2005-202546 A 7/2005
JP 2010-200283 A 9/2010
(Continued)

OTHER PUBLICATIONS

International Preliminary Report on Patentability for International Application No. PCT/JP2014/078415, issued by the International Bureau of WIPO dated Apr. 25, 2017.
(Continued)

*Primary Examiner* — Danh Le

(57) ABSTRACT

It is difficult to distinguish facility types. It is difficult to estimate a fluctuating population from the number of communication terminals. A log information obtaining unit which obtains log information in which positional information of a wireless terminal and clock time information at which the positional information is obtained are associated, a population fluctuation pattern determination unit which determines a population fluctuation pattern based on the log information, a type determination unit which determines a type of a facility based on the population fluctuation pattern determined by the population fluctuation pattern determination unit, with reference to basic pattern information indicating a population fluctuation pattern for each facility type, and an estimated value deriving unit which extracts calculation basic information corresponding to the facility type determined by the type determination unit to derive an estimated value of the population movement of the facility are comprised.

11 Claims, 10 Drawing Sheets

(51) Int. Cl.
   *G06N 5/04* (2006.01)
   *G06Q 30/02* (2012.01)
   *G06Q 50/26* (2012.01)

(58) Field of Classification Search
   USPC .......................... 455/456.1, 550.1, 418, 457
   See application file for complete search history.

(56) References Cited

U.S. PATENT DOCUMENTS

| | | | |
|---|---|---|---|
| 2012/0209658 A1 | 8/2012 | Shibayama et al. | |
| 2013/0090132 A1 | 4/2013 | Terada et al. | |
| 2013/0137459 A1 | 5/2013 | Kobayashi et al. | |
| 2015/0137994 A1* | 5/2015 | Rahman | H04Q 9/04 340/870.07 |
| 2016/0182707 A1* | 6/2016 | Gabel | H04M 1/72541 455/404.2 |
| 2016/0260022 A1 | 9/2016 | Yamada et al. | |
| 2016/0261991 A1* | 9/2016 | Yamada | G06Q 30/0261 |
| 2016/0370843 A1* | 12/2016 | Gatson | G06F 1/3234 |
| 2017/0078621 A1* | 3/2017 | Sahay | G06F 17/2229 |
| 2017/0102467 A1* | 4/2017 | Nielsen | G01S 19/47 |
| 2017/0235622 A1* | 8/2017 | Boyapalle | G06F 11/079 714/47.2 |
| 2017/0257303 A1* | 9/2017 | Boyapalle | H04L 43/14 |

FOREIGN PATENT DOCUMENTS

| | | |
|---|---|---|
| JP | 2013-097471 A | 5/2013 |
| WO | 2009/107618 A1 | 9/2009 |
| WO | 2010/113706 A1 | 10/2010 |
| WO | 2011/021606 A1 | 2/2011 |

OTHER PUBLICATIONS

International Search Report for International Patent Application No. PCT/JP2014/078415, issued by the Japan Patent Office dated Jan. 20, 2015.

Extended European Search Report for European Patent Application No. 14 904 356.4, issued by the European Patent Office dated Jul. 21, 2017.

* cited by examiner

900

| BASIC INFORMATION ID (912) | FACILITY TYPE (914) | CALCULATION BASIC INFORMATION (916) | | | |
|---|---|---|---|---|---|
| | | CALCULATION EXPRESSION (922) | STAY TIME (924) | ... | AREA FACTOR (926) |
| B0001 | HOUSE | *** | *** | ... | *** |
| B0002 | OFFICE | *** | *** | ... | *** |
| B0003 | SCHOOL | *** | *** | ... | *** |
| B0004 | FACTORY, FARM | *** | *** | ... | *** |
| : | : | : | : | : | : |
| B0101 | DEPARTMENT STORE | *** | *** | ... | *** |
| B0102 | THEME PARK | *** | *** | ... | *** |
| B0103 | TOURIST SITE | *** | *** | ... | *** |
| : | : | : | : | : | : |

| FACILITY ID (1012) | FACILITY TYPE (1014) | AREA IDENTIFICATION INFORMATION (1016) | SPECIFICATION (1018) | | |
|---|---|---|---|---|---|
| | | | NUMBER OF ROOMS (1022) | TOTAL FLOOR AREA (1024) | ... |
| F0001 | HOUSE | *** | *** | *** | ... |
| F0002 | OFFICE | *** | *** | *** | ... |
| F0003 | SCHOOL | *** | *** | *** | ... |
| F0004 | FACTORY, FARM | *** | *** | *** | ... |
| : | : | : | : | : | : |
| F0101 | DEPARTMENT STORE | *** | *** | *** | ... |
| F0102 | THEME PARK | *** | *** | *** | ... |
| F0103 | TOURIST SITE | *** | *** | *** | ... |
| : | : | : | : | : | : |

*FIG. 10*

POPULATION ESTIMATION APPARATUS, PROGRAM AND POPULATION ESTIMATION METHOD

The contents of the following PCT patent application are incorporated herein by reference:
NO. PCT/JP2014/078415 filed on Oct. 24, 2014.

BACKGROUND

1. Technical Field

The present invention relates to a population estimation apparatus, a program and a population estimation method.

2. Related Art

It is known to estimate a fluctuating population based on a survey result value for each facility type (refer to Patent Document 1). Also, it is known to identify a fluctuating population by using a communication terminal (refer to Patent Documents 2 to 7).

PRIOR ART DOCUMENT

[Patent Document 1] WO 2011/024379
[Patent Document 2] Japanese Patent Application Publication No. 2013-97471
[Patent Document 3] Japanese Patent Application Publication No. 2005-202546
[Patent Document 4] Japanese Patent Application Publication No. 2010-200283
[Patent Document 5] WO 2010/113706
[Patent Document 6] WO 2010/116916
[Patent Document 7] WO 2011/021606

However, according to the prior art, there are problems such as a difficulty in distinguish facility types and a difficulty in fluctuating population estimation from the number of communication terminals.

BRIEF DESCRIPTION OF THE DRAWINGS

FIG. 9 schematically illustrates one example of a data table 900.

FIG. 10 schematically illustrates one example of a data table 1000.

DESCRIPTION OF EXEMPLARY EMBODIMENTS

Figure 1:
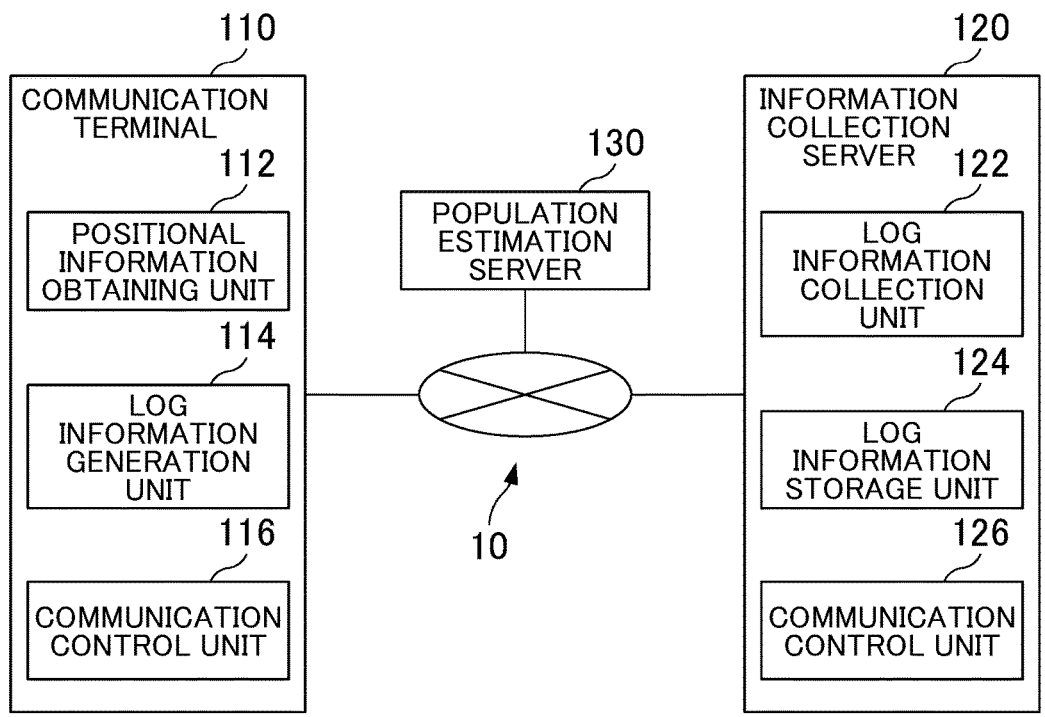
FIG. 1 schematically illustrates one example of a population estimation system 100.

Hereinafter, one aspect of the present invention is described through the embodiments of the invention. However, the following embodiments are not to limit the claimed inventions. Also, all of combinations of features described in the embodiments are not necessarily required for a means for solving problems of the invention. Note that in the drawings, the same reference numerals may be applied to the same or similar portions and the redundant descriptions may be omitted.

FIG. 1 schematically illustrates one example of a population estimation system 100. The population estimation system 100 estimates a population or a population movement of an arbitrary area. In the present embodiment, the population estimation system 100 estimates a population or a population movement by using positional information of one or more communication terminals 110. The arbitrary area just needs to be a division having a predetermined geographic range and may be illustrated as, for example, a facility, an administrative division (which may be referred to as an administrative segment, an administrative district and the like), a division subject to a national census, a division which is an area subdivided by an unit region having a predetermined size and shape (which may be referred to as an area mesh and the like).

The facility is not particularly limited as long as it is a building or a site visited by persons. The facility is classified into, for example, a steadily fluctuating facility which is a facility mainly visited by specified persons constantly and a variably fluctuating facility which is a facility mainly visited by unspecified persons inconstantly. As the steadily fluctuating facility, for example, a house, an office, a school, a factory, a farm, a wholesale market, and a warehouse may be illustrated. The house may be a single-family house or may be a housing complex. As the variably fluctuating facility, for example, a retailer, a department store, a theater, a concert hall, a stadium, an amusement park, a zoo, a museum, a theme park, a leisure facility, a bathing beach, a ski site, a camp site, a tourist site, a resort, a park, a public facility, a shrine, and a temple may be illustrated. As the public facility, for example, a station, an airport, a government office and an administrative office may be illustrated.

In the present embodiment, the population estimation system 100 includes a communication terminal 110, an information collection server 120, and a population estimation server 130. The communication terminal 110 includes a positional information obtaining unit 112, a log information generation unit 114, and a communication control unit 116. Also, the information collection server 120 includes a log information collection unit 122, a log information storage unit 124, and a communication control unit 126. Each of the population estimation system 100 and the population estimation server 130 may be one example of the population estimation apparatus. The communication terminal 110 may be one example of one or more wireless terminals. Each of the information collection server 120 and the log information collection unit 122 may be one example of the log information obtaining unit.

Each of the communication terminal 110, the information collection server 120 and the population estimation server 130 may transmit and receive information with one another via the communication network 10. The communication network 10 may be a transmission path for wired communication, may be a transmission path for wireless communication, or may be a combination of a transmission path for wireless communication and a transmission path for wired communication. The communication network 10 may be a mobile communication network such as a cellular phone network, a wireless packet communication network, the Internet and a dedicated line, or a combination thereof.

The communication terminal 110 includes a communication function. The communication terminal 110 may include a wireless communication function. The communication terminal 110 may also correspond to a plurality of communication systems. For example, the communication terminal 110 corresponds to both of communication systems of a mobile communication system such as 3G, LTE, and 4G systems, and a wireless communication system such as WiFi (registered trademark) and WiMAX (registered trademark). The communication terminal 110 just needs to be an apparatus which can transmit and receive information with at least one of the information collection server 120 and the population estimation server 130, and may be, for example, a personal computer, a cellular phone or a smart phone, a mobile terminal (which may be illustrated as a PDA, a tablet, a notebook computer or a laptop computer and the like), and a wireless terminal including Web browser software introduced therein.

The communication terminal 110 may be achieved by activating software or a program that defines operations of each unit of the communication terminal 110 in an information processing apparatus having a general configuration. The information processing apparatuses used as the communication terminal 110 may include a data processing apparatus having a processor such as a CPU, an ROM, an RAM, a communication interface and the like; an input apparatus such as a keyboard, a touch panel, or a microphone, a GPS information obtaining apparatus, an acceleration sensor, a gyro sensor; an output apparatus such as a display apparatus, a speaker and a vibration apparatus; and a storage apparatus such as a memory and an HDD. The data processing apparatus or the storage apparatus may store the software or the program described above. The software or the program described above causes, by being executed by a processor, the information processing apparatus described above to execute operations defined by the software or the program.

The positional information obtaining unit 112 obtains positional information indicating a position of the communication terminal 110. The positional information may be information indicating latitude and longitude, and may further include information indicating altitude. The positional information may be information indicating an address. The positional information obtaining unit 112 may obtain the positional information of the communication terminal 110 based on a GPS signal received from a GPS satellite. Based on electric field intensities of radio waves and the like received from one or more base stations or access points of the communication network 10, the positional information of the communication terminal 110 may be obtained. Based on electric field intensities of radio waves and the like from the communication terminal 110 at one or more base stations or access points of the communication network 10, the positional information of the communication terminal 110 may be obtained.

The positional information obtaining unit 112 may also obtain information about accuracy of the positional information (which may be referred to as positioning accuracy information). The accuracy of the positional information is represented by, for example, using a CEP (Circular Error Probability). If a probability that a GPS receiver is positioned within a particular circle is 50%, the CEP is represented as a radius of the circle. If the GPS receiver is positioned at a location which allows it to receive GPS signals easily (which may be illustrated as outdoors, an indoor window side and the like), the CEP becomes a small value. On the one hand, if the GPS receiver is positioned at a location which does not allow it to receive GPS signals easily, the CEP becomes a large value.

The positional information obtaining unit 112 may obtain the positional information in a predetermined time or may also obtain the positional information at a predetermined time interval. The positional information obtaining unit 112 may also obtain the positional information if a user executes a predetermined operation by using the communication terminal 110. As the predetermined operation, for example, an input/selection operation of information, a power ON/OFF operation, and a start/end operation of calling may be illustrated. The positional information obtaining unit 112 may also obtain the positional information in the background.

The log information generation unit 114 associates each of one or more pieces of positional information obtained by the positional information obtaining unit 112 with clock time information indicating a clock time at which the positional information is obtained to generate one or more pieces of log information. The log information generation unit 114 may also associate terminal identification information for identifying each of one or more communication terminals 110, the positional information, and the clock time information with one another to generate the log information. The log information generation unit 114 may also associate the positional information, the positioning accuracy information, and the clock time information with one another to generate the log information. The log information generation unit 114 may also associate the terminal identification information, the positional information, the positioning accuracy information, and the clock time information with one another to generate the log information. In the present embodiment, the log information generation unit 114 transmits the generated log information to the information collection server 120.

The terminal identification information is not particularly limited as long as it is information which allows for identification of one or more communication terminals 110, respectively. In one embodiment, following items are used as the terminal identification information such as: for example, an MAC address of the communication terminal 110; a BD address (which may be referred to as a BD_ADDR and the like) for identifying a device which supports Bluetooth (registered trademark); an ID specific for a communication terminal such as an address for identifying a device which supports ZigBee (registered trademark); an ID specific for a communication terminal recorded in each type of SIM (Subscriber Identity Module) cards; and an ID specific for a subscriber of a communication terminal assigned to the subscriber (which may be referred to as a subscriber-specific ID, and also, which may be referred to as a terminal manufacturing number, a user ID, an i mode (registered trademark) ID, a subscriber ID, an EZ number, a terminal serial number and the like, depending on a communication carrier).

In another embodiment, as the terminal identification information, information is used which allows the communication terminal 110 to be identified uniquely while suppressing identification of a user. This allows for analysis of the log information considering a temporal relationship between the log information, without identifying a user. For example, a randomly selected code string is provided as the terminal identification information of a particular communication terminal 110. The code string may be a code string specific for each of one or more communication terminals 110, or may also be reused among a plurality of communication terminals 110. The terminal identification information may be updated each predetermined time period, may be updated at a predetermined clock time, or may be updated at an arbitrary timing in response to an instruction from a user and the like.

The communication control unit 116 controls a communication among the communication terminal 110, the communication network 10, and at least one of the information collection server 120 and the population estimation server 130. The communication control unit 116 may be a communication interface. The communication control unit 116 may correspond to a plurality of communication systems.

The information collection server 120 collects each type of information such as the log information. The log information collection unit 122 collects the log information. In one embodiment, the log information collection unit 122 receives one or more pieces of log information from each of one or more communication terminals 110. In another embodiment, the log information collection unit 122 receives one or more pieces of log information from each of one or more base stations or access points of the communication network 10.

The log information storage unit 124 stores the log information collected by the log information collection unit 122. The log information storage unit 124 may also transmit the log information to the population estimation server 130, in response to a request from the population estimation server 130.

The communication control unit 126 controls a communication among the information collection server 120, the communication network 10, and at least one of the communication terminal 110 and the population estimation server 130. The communication control unit 126 may be a communication interface. The communication control unit 126 may correspond to a plurality of communication systems.

The population estimation server 130 estimates a population or a population movement of an arbitrary area. In the present embodiment, the population estimation server 130 estimates a population or a population movement of an arbitrary area by using the log information collected by the information collection server 120.

In one embodiment, the population estimation server 130 divides an area subject to population or population movement estimation into one or more geographic ranges (which may be referred to as subareas). The population estimation server 130 determines population fluctuation patterns indicating temporal population fluctuations of each of one or more subareas, respectively, by using the log information collected by the information collection server 120. The population estimation server 130 determines each facility type in each of one or more subareas based on the determined population fluctuation pattern and basic pattern information indicating a population fluctuation pattern for each facility type.

The population estimation server 130 determines, based on the determined facility type, calculation basic information applied to each of one or more subareas among predetermined calculation basic information for each facility type. The calculation basic information is a calculation expression, for example, for estimating a population or a population movement of the facility, based on specifications of the facility. The population estimation server 130 estimates the population or the population movement of each facility in one or more subareas, based on the determined calculation basic information and specifications of each facility in one or more subareas. The population estimation server 130 can estimate the population or the population movement of an arbitrary area, by counting up the population or the population movement of each facility in one or more subareas to.

Each of the information collection server 120 and the population estimation server 130 may be achieved, in an information processing apparatus of a general configuration, by activating software or a program which defines operations of each unit of each of the information collection server 120 and the population estimation server 130. The information processing apparatuses used as the information collection server 120 and the population estimation server 130 may include a data processing apparatus having a processor such as a CPU, an ROM, an RAM, a communication interface and the like; an input apparatus such as a keyboard, a touch panel, or a microphone; an output apparatus such as a display apparatus or a speaker, and a storage apparatus such as a memory or an HDD. The data processing apparatus or the storage apparatus may store the software or the program described above. The software or the program described above causes, by being executed by a processor, the information processing apparatus described above to execute operations defined by the software or the program.

Each of the information collection server 120 and the population estimation server 130 may be a virtual server or a cloud system. Each of the information collection server 120 and the population estimation server 130 may be achieved by a single server, or may be achieved by a plurality of servers. Also, the information collection server 120 and the population estimation server 130 may be achieved on the same physical server, or the information collection server 120 and the population estimation server 130 may be the same server.

Figure 2:
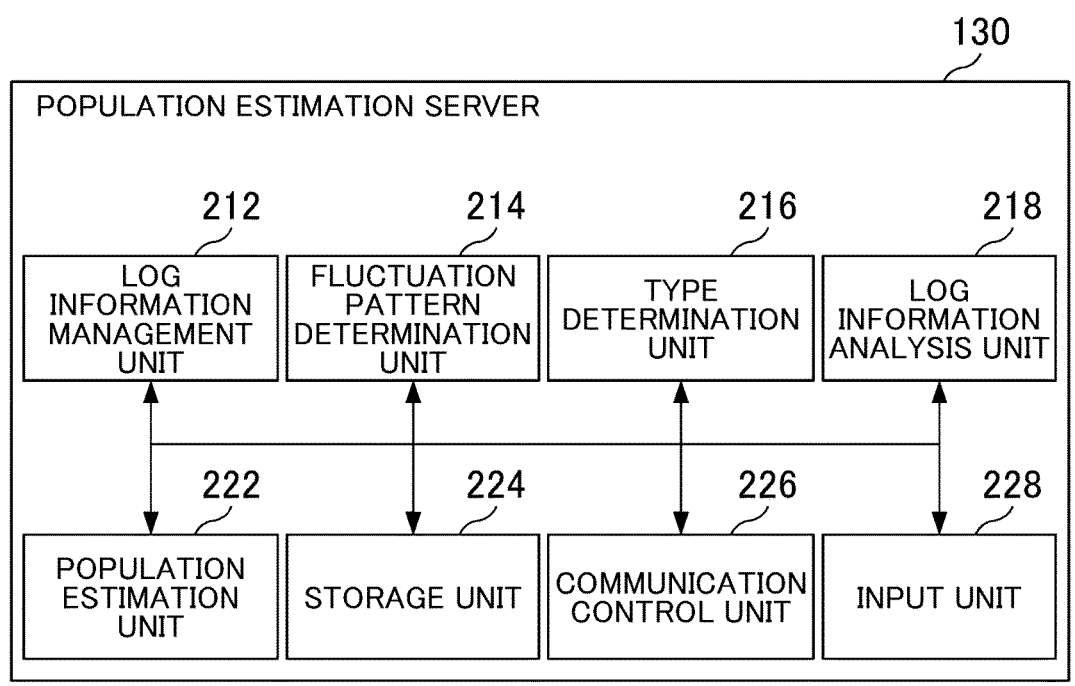
FIG. 2 schematically illustrates one example of a population estimation server 130.

FIG. 2 schematically illustrates one example of a population estimation server 130. In the present embodiment, the population estimation server 130 executes, for example, (i) an interpolation process of the log information, (ii) a population estimation process of an arbitrary area, and (iii) a generation process or an update process of the basic pattern information and the calculation basic information.

In the present embodiment, the population estimation server 130 includes a log information management unit 212, a fluctuation pattern determination unit 214, a type determination unit 216, a log information analysis unit 218, a population estimation unit 222, a storage unit 224, a communication control unit 226, and an input unit 228. The log information management unit 212 may be one example of the log information obtaining unit. The population estimation unit 222 may be one example of the estimated value deriving unit. The storage unit 224 may be one example of the basic information storage unit.

The log information management unit 212 manages the log information. In the present embodiment, the log information management unit 212 obtains the log information collected by the information collection server 120. The log information management unit 212 stores the obtained log information in the storage unit 224. The log information management unit 212 may analyze a plurality of pieces of log information associated with at least one communication terminal 110 to interpolate the log information. The log information management unit 212 may analyze the obtained log information to generate or update at least one of the basic pattern information and the calculation basic information.

The fluctuation pattern determination unit 214 determines, based on the log information, a population fluctuation pattern of a particular geographic range. In the present embodiment, the fluctuation pattern determination unit 214 first receives from the input unit 228 input information indicating an area and a time subject to population or population movement estimation. The fluctuation pattern determination unit 214 determines one or more geographic ranges for identifying the area subject to population or population movement estimation. For example, the fluctuation pattern determination unit 214 divides the area subject to population or population movement estimation into one or more subareas. Each of one or more subareas may be one example of a particular geographic range. The area subject to population or population movement estimation may be one example of a region including a plurality of particular geographic ranges.

Each of one or more subareas may be determined by information indicating boundaries between each facility, or may be determined by a division which is an area subdivided by a unit region having a predetermined size and shape (which may be referred to as an area mesh and the like). In one embodiment, each of one or more subareas is determined by the area mesh included in the subarea. In another embodiment, each of one or more subareas is determined by the area mesh in which the subarea is included.

Next, the fluctuation pattern determination unit 214 determines, for each of one or more subareas, a population fluctuation pattern indicating temporal population fluctuations. The fluctuation pattern determination unit 214 counts up, based on the log information stored in the storage unit 224, the number of communication terminals 110 present in each region in each of one or more subareas in each predetermined time to determine the population fluctuation pattern of each of one or more subareas. The fluctuation pattern determination unit 214 may also normalize a final count of the number of communication terminals 110 in each predetermined time to determine the population fluctuation pattern.

The predetermined time may be a predetermined clock time or may be a predetermined time segment. The predetermined time segment may be at least one selected from among five minutes, 10 minutes, 30 minutes, one hour, three hours, six hours, 12 hours, one day, one week, one month, three months, six months, one year, weekday, holiday, and each day of the week, and each time zone. The predetermined time segment may also be the same as an update cycle of the terminal ID.

For counting up the number of communication terminals 110 present in an area in each of one or more subareas in each predetermined time segment, the fluctuation pattern determination unit 214 may execute a noise removal process (which may be referred to as a cleansing process) in advance. For example, the fluctuation pattern determination unit 214 first calculates, based on the log information of each communication terminal 110 present in the area in the subarea, a stay time of each communication terminal 110 in the subarea. Next, based on information about the stay time described above, a frequency distribution of the stay times of the communication terminals 110 in the subarea is calculated.

Next, the fluctuation pattern determination unit 214 calculates, for example, a mode value of the stay time or a local maximum value of the frequency distribution curve, based on the calculated frequency distribution. Then, the fluctuation pattern determination unit 214 compares the stay time of each of the communication terminals 110 in the subarea to the mode value or the local maximum value of the stay time described above. If an absolute value of a difference between the stay time of the particular communication terminal 110 and the mode value or the local maximum value of the stay time described above is larger than a predetermined value, the fluctuation pattern determination unit 214 determines that the particular communication terminal 110 is a noise.

In one embodiment, if the predetermined time segment is longer than one day, the fluctuation pattern determination unit 214 counts up the number of communication terminals 110 present in the area in each subarea to calculate "the number of visitors per day" in each subarea. If the particular communication terminal 110 is present in the particular subarea continuously in time order, the fluctuation pattern determination unit 214 may treat together the log information in the time periods during which the particular communication terminal 110 is present continuously in time order to count it for one terminal. The fluctuation pattern determination unit 214 may also determine the population fluctuation pattern based on "the number of visitors per day".

The type determination unit 216 determines the facility type in each of one or more geographic ranges, with reference to the basic pattern information indicating the population fluctuation pattern for each facility type and based on the population fluctuation pattern determined by the fluctuation pattern determination unit 214. For example, the type determination unit 216 compares the population fluctuation pattern of each of one or more geographic ranges to each of one or more pieces of basic pattern information to extract the basic pattern information of which a degree of match is larger than a predetermined reference value, with respect to the population fluctuation pattern of each of one or more geographic ranges. The type determination unit 216 determines a facility type associated with the extracted basic pattern as the facility type in each of one or more geographic ranges.

The type determination unit 216 may also compare a function expression which approximates the population fluctuation pattern of each of one or more geographic ranges to each of one or more pieces of basic pattern information. The function expression which approximates the population fluctuation pattern of each of one or more geographic ranges may be determined by a known algorithm such as the least square method. For example, the type determination unit 216 compares the function expression which approximates the population fluctuation pattern of each of one or more geographic ranges to each function expression which approximates one or more basic patterns stored in the storage unit 224 to calculate degrees of match of the both sides, based on, for example, types of functions and degrees of correlation of factors of each function included in each function expression.

The type determination unit 216 may also compare, by a similar procedure, the function expression which approximates the population fluctuation pattern of each of one or more geographic ranges to a combination of a plurality of basic patterns. For example, if the degree of match between the population fluctuation pattern of the particular geographic range and a population fluctuation pattern which is a combination of a basic pattern of a facility A, a basic pattern of a facility B and a basic pattern of a facility C at percentages of 50%, 30% and 20%, respectively, is higher than the predetermined value, the type determination unit 216 determines that the facility A, the facility B and the facility C are included in the particular geographic range.

The type determination unit 216 determines the facility type corresponding to the extracted basic pattern information as a facility type in a geographic range of a comparison target. If a plurality of basic patterns are extracted, the type determination unit 216 may also determine the facility type corresponding to the basic pattern of the largest degree of match as the facility type in the geographic range of the comparison target.

The log information analysis unit 218 analyzes the log information to generate or update at least one of the basic pattern information and the calculation basic information. The log information analysis unit 218 may compare an analysis result of the log information about the particular facility to an actual survey result value of the population or the population movement of the particular facility to generate or update at least one of the basic pattern information and the calculation basic information. This can reduce the actual number of facilities subject to a survey without decreasing accuracy of the basic pattern information and the calculation basic information.

The population estimation unit 222 estimates a population or a population movement of an arbitrary area. In the present embodiment, the population estimation unit 222 obtains from the fluctuation pattern determination unit 214 information about one or more geographic ranges for identifying an area indicated by the input information. The population estimation unit 222 derives an estimated value of a population or population movement of each of one or more geographic ranges. The population estimation unit 222 counts up the estimated value of the population or population movement of each of one or more geographic ranges to derive the estimated value of the population or population movement of the arbitrary area, for example.

In the present embodiment, the population estimation unit 222 obtains specification information about specifications of facilities included in each of one or more geographic ranges. The population estimation unit 222 may obtain the specification information stored in the storage unit 224, may obtain the specification information stored in an external storage apparatus via the communication control unit 226, or may obtain the specification information input to the input unit 228 by a user. The population estimation unit 222 may obtain the specification information depending on the facility type.

As the specification information of a facility, for example, the number of rooms, an estimation expression of the number of rooms, an area ratio of a common space, a total floor area, an area per room, the number of users per room, a stay time of one user per day, an operation ratio, a rotation ratio, a correction factor depending on an area, a standard capacity, a maximum capacity, the number of cars parked in a parking lot, an area of a parking lot, and the annual number of users or the monthly number of users for one car parked in a parking lot may be illustrated. The estimation expression of the number of rooms is a calculation expression for estimating the number of rooms based on information included in the specification information. The estimation expression of the number of rooms is represented, for example, as (total floor area−area of common space)/(area per room).

The population estimation unit 222 extracts the calculation basic information corresponding to the facility type determined by the type determination unit 216 for each of one or more geographic ranges, for example, with reference to the storage unit 224. The population estimation unit 222 derives, based on the specification information of a facility included in each of one or more geographic ranges and the extracted calculation basic information, an estimated value of a population movement of the facility included in each of one or more geographic ranges.

In another embodiment, the population estimation unit 222 first derives an estimated value of a population movement of a facility in each of one or more geographic ranges in a first time segment. Next, it extracts, among a plurality of pieces of basic pattern information corresponding to facility types determined by the type determination unit 216, the basic pattern information indicating a population fluctuation in each second time segment. Then, it derives, based on the extracted basic pattern information and the estimated value of the population movement in the first time segment, an estimated value of the population movement of the facility in each of one or more geographic ranges in each second time segment.

The first time segment may be longer than the second time segment. For example, the first time segment is one day and the second time segment is one hour. The first time segment may be one month or one week and the second time segment may be one day or each day of the week.

In another embodiment, if the calculation basic information further includes stay time information indicating a stay time of a visitor per day for each facility type, the population estimation unit 222 may also derive a fluctuating population potential which is an index value of a potential fluctuating population, based on the estimated value of the population movement in each second time segment and the stay time information. If the number of visitors per year is surveyed or defined in a particular facility or an area, the population estimation unit 222 may derive the fluctuating population potential by proportionally allocating, depending on the type of the particular facility, the total number of visitors for individual months and days in consideration of a fluctuation ratio of the number of visitors for each season, month and day of the week. The population estimation unit 222 may also derive, depending on the type of the particular facility described above, the fluctuating population potential for each time zone, in further consideration of a stay time per person.

The storage unit 224 store each type of information used for information processing in the log information management unit 212, the fluctuation pattern determination unit 214, the type determination unit 216, the log information analysis unit 218, the population estimation unit 222 and the like. The storage unit 224 may also store information generated by information processing in the log information management unit 212, the fluctuation pattern determination unit 214, the type determination unit 216, the log information analysis unit 218, the population estimation unit 222 and the like.

In the present embodiment, the communication control unit 226 controls a communication among the population estimation server 130, the communication network 10, and at least one of the communication terminal 110 and the information collection server 120. The communication control unit 226 may be a communication interface. The communication control unit 226 may correspond to a plurality of communication systems.

The input unit 228 receives an input from a user. In the present embodiment, the input unit 228 inputs input information indicating an area and a time subject to population or population movement estimation. The time subject to population or population movement estimation may be a particular clock time or may be a particular time period. As the input unit 228, for example, a keyboard, a pointing device, a touch panel, and a microphone may be illustrated.

Figure 3:
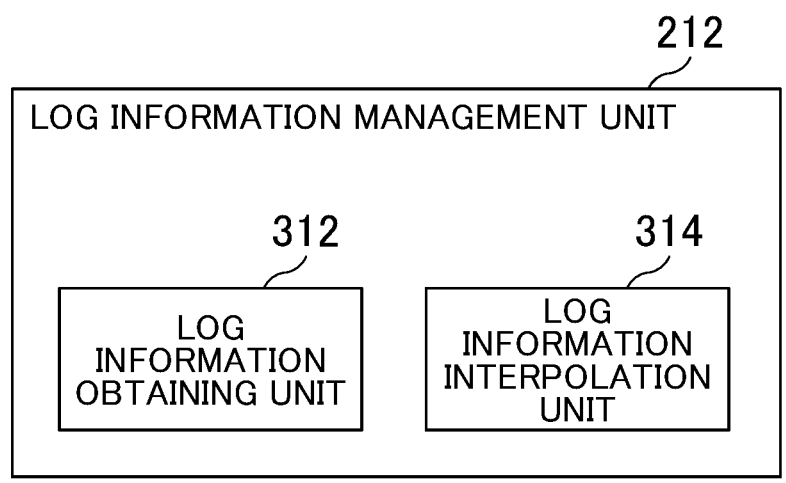
FIG. 3 schematically illustrates one example of the log information management unit 212.

FIG. 3 schematically illustrates one example of the log information management unit 212. In the present embodiment, the log information management unit 212 includes a log information obtaining unit 312 and a log information interpolation unit 314. The log information interpolation unit 314 may be one example of an interpolation information generation unit.

The log information obtaining unit 312 obtains the log information collected by the information collection server 120. The log information obtaining unit 312 stores the obtained log information in the storage unit 224. Note that the log information obtaining unit 312 may also obtain the log information from the communication terminal 110, and a base station or an access point of the communication network 10.

The log information interpolation unit 314 generates information for interpolating the log information. For example, the log information interpolation unit 314 first classifies a plurality of pieces of log information obtained from the information collection server 120 for each communication terminal 110. Also, the log information interpolation unit 314 sorts a plurality of pieces of log information classified for each communication terminal 110, based on the clock time information in the log information. Next, for each of two paired pieces of log information which are continuous in time order, the log information interpolation unit 314 compares the clock time information in the two pieces of log information. If an interval between clock times indicated by the clock time information of two pieces of log information is larger than a predetermined value, the log information interpolation unit 314 generates information for interpolating the two pieces of log information.

An interpolation method of the log information is not particularly limited, but for example, if a distance between positions indicated by positional information of two pieces of log information is smaller than a predetermined value, the log information interpolation unit 314 generates one or more pieces of log information which include the positional information of either of two pieces of log information and clock time information determined such that the log information is obtained at a predetermined time interval. The log information interpolation unit 314 may also generate one or more pieces of log information which include the positional information of either of two pieces of log information and clock time information indicating a predetermined clock time.

On the one hand, if the distance between the positions indicated by positional information of two pieces of log information is larger than the predetermined value, the log information interpolation unit 314 generates one or more pieces of log information such that, for example, positions indicated by the log information generated in the interpolation process are arranged at a regular interval on a straight line connecting the positions indicated by two pieces of log information. In this case, the log information interpolation unit 314 may also calculate a moving speed of the communication terminal 110 based on two pieces of log information and generate the clock time information of the log information generated by the interpolation based on the moving speed of the communication terminal 110. Note that if the position indicated by the positional information of two pieces of log information is arranged on a road or on a rail, the log information interpolation unit 314 may also generate one or more pieces of log information such that the position indicated by the log information generated by the interpolation is positioned on the road or on the rail.

Figure 4:
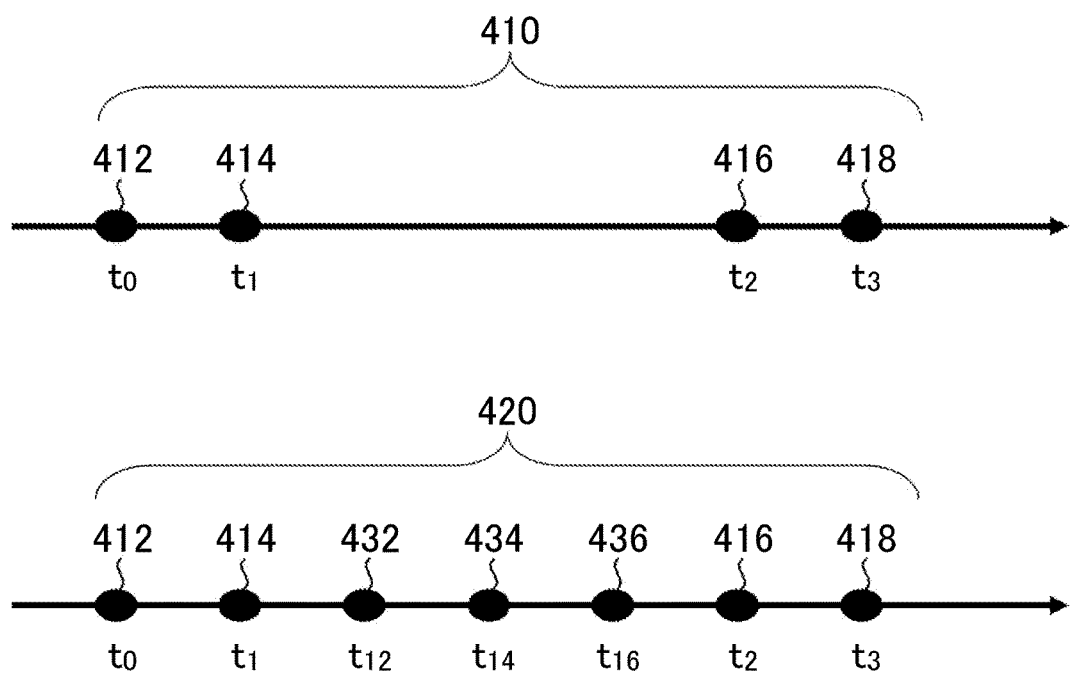
FIG. 4 schematically illustrates one example of an interpolation method of log information.

FIG. 4 schematically illustrates one example of the interpolation method in the log information interpolation unit 314. In the present embodiment, the log information 410 before an interpolation includes log information 412, log information 414, log information 416 and log information 418. For simplicity of the description, one example of the interpolation method is described by using as an exemplary case in which a time between a clock time t0 and a clock time t1 and a time between a clock time t2 and a clock time t3 are five minutes, respectively, and a time between the clock time t1 and the clock time t2 is 20 minutes.

In the present embodiment, the log information interpolation unit 314 first determines, for each of the log information 412 and the log information 414, the log information 414 and the log information 416, and the log information 416 and the log information 418, whether an interval between the clock times of the two pieces of log information is larger than five minutes. In the present embodiment, because the interval between the clock times of the log information 414 and the log information 416 is larger than five minutes, the log information interpolation unit 314 determines to generate one or more pieces of log information for interpolating the log information 414 and the log information 416.

In the present embodiment, the log information interpolation unit 314 generates log information 432, log information 434 and log information 436. Clock time information of the log information 432, the log information 434 and the log information 436 is determined such that, for example, the log information 432, the log information 434 and the log information 436 are arranged at a regular interval in time order. Positional information of the log information 432, log information 434 and the log information 436 is determined based on positions indicated by the positional information of the log information 414 and the log information 416. The log information interpolation unit 314 stores interpolated log information 420 which includes the log information 432, the log information 434 and the log information 436 in the storage unit 224. This allows a population at an arbitrary clock time to be readily estimated.

Figure 5:
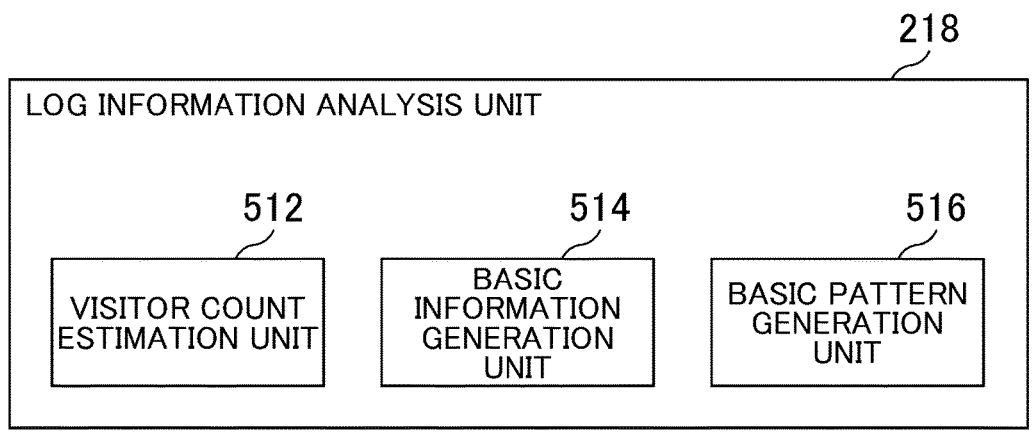
FIG. 5 schematically illustrates one example of a log information analysis unit 218.

FIG. 5 schematically illustrates one example of a log information analysis unit 218. In the present embodiment, the log information analysis unit 218 includes a visitor count estimation unit 512, a basic information generation unit 514, and a basic pattern generation unit 516.

The visitor count estimation unit 512 estimates, based on the log information, the number of visitors of a facility in each of one or more geographic ranges in a predetermined time period. More particularly, the visitor count estimation unit 512 counts up the number of communication terminals 110 present in the facility in each of one or more geographic ranges in the predetermined time period, based on the log information stored in the storage unit 224, for example. The visitor count estimation unit 512 derives an estimated value of the number of visitors by multiplying the number of communication terminals 110 by a parameter indicating correlation between the number of visitors and the number of communication terminals 110.

The parameter indicating correlation between the number of visitors and the number of communication terminals 110 is calculated in advance, for example, based on a prior field survey. This allows the number of visitors to be derived with a relatively high accuracy in facilities several times as many as those subject to field surveys. As a result, in the generation process or the update process of the calculation basic information or the basic pattern information, data can be collected efficiently in statistically significant numbers.

The basic information generation unit 514 generates the calculation basic information, based on the number of visitors determined by the visitor count estimation unit 512. The basic information generation unit 514 stores the generated calculation basic information in the storage unit 224. The basic information generation unit 514 may also update the calculation basic information stored in the storage unit 224, by using the generated calculation basic information.

The basic pattern generation unit 516 generates the basic pattern information, for example, based on the log information stored in the storage unit 224. More particularly, the basic pattern generation unit 516 generates the population fluctuation pattern indicating the temporal population fluctuation of the facility in each of one or more geographic ranges, based on the number of visitors determined by the visitor count estimation unit 512 or the number of communication terminals 110 present in the facility in each of one or more geographic ranges in the predetermined time period. The basic pattern generation unit 516 may also generate a function expression which approximates the population fluctuation pattern described above. The function expression which approximates the population fluctuation pattern is not particularly limited, but may include a linear function, an exponent function, a logarithm function, a trigonometric function, and a combination thereof. The function expression which approximates the population fluctuation pattern may be determined by a known algorithm such as the least square method.

Next, the basic pattern generation unit 516 determines the facility type in each of one or more geographic ranges, based on the specification information or the population fluctuation pattern of the facility in each of one or more geographic ranges. The basic pattern generation unit 516 generates the basic pattern information such that the generated population fluctuation pattern and the determined facility type are associated with each other. The basic pattern generation unit 516 stores the generated basic pattern information in the storage unit 224. The basic pattern generation unit 516 may also update the basic pattern information stored in the storage unit 224, by using the generated basic pattern information.

Figure 6:
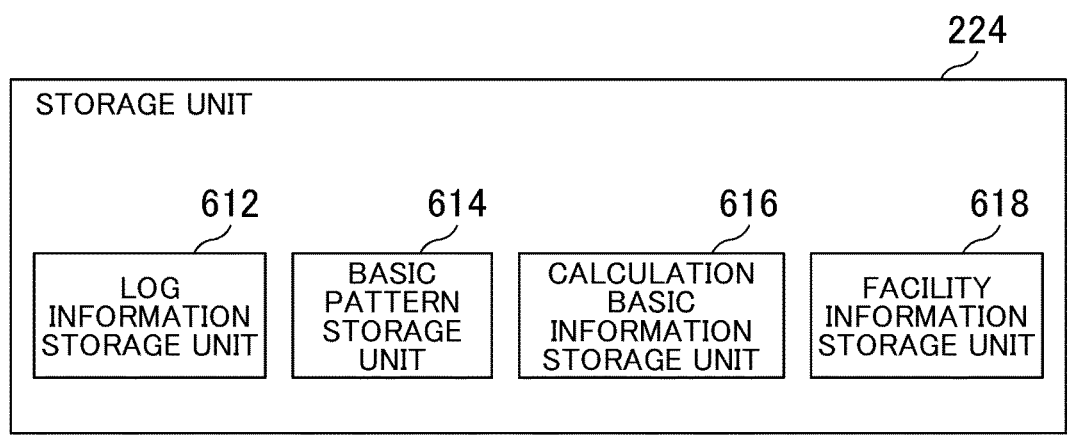
FIG. 6 schematically illustrates one example of a storage unit 224.

FIG. 6 schematically illustrates one example of a storage unit 224. In the present embodiment, the storage unit 224 includes a log information storage unit 612, a basic pattern storage unit 614, a calculation basic information storage unit 616, and facility information storage unit 618. The log information storage unit 612 stores the log information obtained by the log information management unit 212. The basic pattern storage unit 614 stores the basic pattern information indicating the population fluctuation pattern for each facility type. The calculation basic information storage unit 616 stores the calculation basic information for each facility type used for population movement estimation. The facility information storage unit 618 stores the facility information which includes the specification information of the facility.

Figure 7:
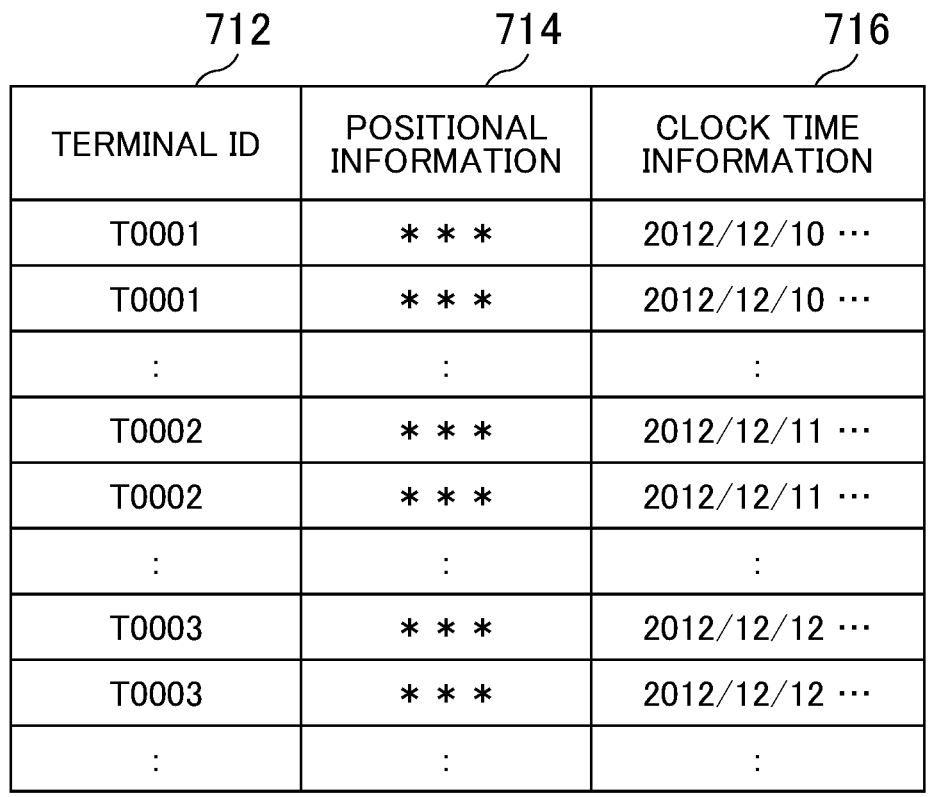
FIG. 7 schematically illustrates one example of a data table 700.

FIG. 7 schematically illustrates one example of a data table 700. The data table 700 may be one example of the log information stored in the log information storage unit 612. In the present embodiment, the data table 700 stores a terminal ID 712, positional information 714 indicating a position of the communication terminal 110 identified by the terminal ID 712, and clock time information 716 indicating a clock time at which the positional information 714 is obtained such that they are associated with one another. The terminal ID 712 may be one example of the terminal identification information.

Figure 8:
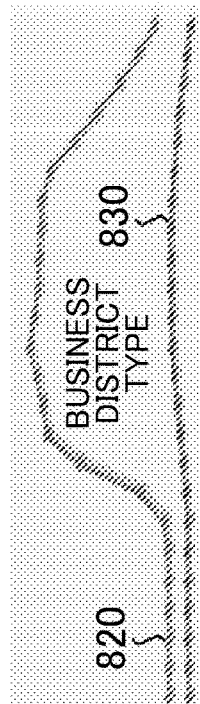
FIG. 8 schematically illustrates one example of a data table 800.

FIG. 8 schematically illustrates one example of a data table 800. The data table 800 may be one example of the basic pattern information stored in the basic pattern storage unit 614. In the present embodiment, the data table 800 stores a pattern ID 812, a facility type 814 of a facility to which the basic pattern identified by the pattern ID 812 is applied, and basic pattern information 816 of the basic pattern identified by the pattern ID 812 such that they are associated with one another. The basic pattern information 816 includes, for example, information about a temporal population fluctuation pattern on weekdays 820 and information about a temporal population fluctuation pattern on holidays 830.

FIG. 9 schematically illustrates one example of a data table 900. The data table 900 may be one example of the calculation basic information stored in the calculation basic information storage unit 616. In the present embodiment, the data table 900 stores a basic information ID 912, a facility type 914 of a facility to which the calculation basic information identified by the basic information ID 912 is applied, and calculation basic information 916 identified by the basic information ID 912 such that they are associated with one another. The calculation basic information 916 includes items such as a calculation expression 922 for estimating a population based on specifications of each facility, a stay time per day 924 of a visitor for each facility type, and an area factor 926. The area factor 926 may be a correction factor depending on the area.

The calculation basic information 916 may also include first calculation basic information for each type of a steadily fluctuating facility, used for population movement estimation of the steadily fluctuating facility, where the steadily fluctuating facility is a facility constantly visited by specified persons, and second calculation basic information for each type of a variably fluctuating facility, used for population movement estimation of the variably fluctuating facility, where the variably fluctuating facility is a facility inconstantly visited by unspecified persons. The calculation expression 922 may include a calculation expression defined by correlation between the number of visitors of the variably fluctuating facility and the number of cars parked in a parking lot of the variably fluctuating facility. The calculation expression 922 may include a calculation expression defined by correlation between the number of visitors of the variably fluctuating facility and a capacity-related condition of the variably fluctuating facility.

FIG. 10 schematically illustrates one example of a data table 1000. The data table 1000 may be one example of the facility information stored in the facility information storage unit 618. In the present embodiment, the data table 1000 stores a facility ID 1012, a facility type 1014 of the facility identified by the facility ID 1012, area identification information 1016 for identifying the geographic range of the facility identified by the facility ID 1012, and information indicating a specification 1018 of the facility identified by the facility ID 1012 such that they are associated with one another. As the specification 1018, for example, the number of rooms 1022 and a total floor area 1024 may be illustrated.

The area identification information 1016 just needs to be information indicating a boundary of the facility identified by the facility ID 1012, but is not particularly limited. As the area identification information 1016, for example, positional information of a feature point of the geographic range of the facility, information for identifying an area mesh included in the geographic range of the facility, and information for identifying an area mesh in which the facility is included may be illustrated. If the boundary of the facility includes a polygon, the feature point of the geographic range of the facility may be an apex of the polygon. If the boundary of the facility includes a circle or an oval, the feature point of the geographic range of the facility may be a center and a radius or major and minor diameters of the circle or the oval. The area identification information 1016 may also include information about the height. The information about the height may be, in a building having a plurality of floors, information for identifying a floor on which the particular facility is present.

While the embodiments of the present invention have been described, the technical scope of the invention is not limited to the above described embodiments. It is apparent to persons skilled in the art that various alterations and improvements can be added to the above-described embodiments. Also, unless a technical contradiction occurs, the matters described in the particular embodiment can be applied to another embodiment. It is also apparent from the scope of the claims that the embodiments added with such alterations or improvements can be included in the technical scope of the invention.

The operations, procedures, steps, and stages of each process performed by an apparatus, system, program, and method shown in the claims, embodiments, or diagrams can be performed in any order as long as the order is not indicated by "prior to," "before," or the like and as long as the output from a previous process is not used in a later process. Even if the process flow is described using phrases such as "first" or "next" in the claims, embodiments, or diagrams, it does not necessarily mean that the process must be performed in this order.

EXPLANATION OF REFERENCES

10: communication network, 20: information providing server, 100: population estimation system, 110: communication terminal, 112: positional information obtaining unit, 114: log information generation unit, 116: communication control unit, 120: information collection server, 122: log information collection unit, 124: log information storage unit, 126: communication control unit, 130: population estimation server, 212: log information management unit, 214: fluctuation pattern determination unit, 216: type determination unit, 218: log information analysis unit, 222: population estimation unit, 224: storage unit, 226: communication control unit, 228: input unit, 312: log information obtaining unit, 314: log information interpolation unit, 410: log information, 412: log information, 414: log information, 416: log information, 418: log information, 420: log information, 432: log information, 434: log information, 436: log information, 512: visitor count estimation unit, 514: basic information generation unit, 516: basic pattern generation unit, 612: log information storage unit, 614: basic pattern storage unit, 616: calculation basic information storage unit, 618: facility information storage unit, 700: data table, 712: terminal ID, 714: positional information, 716: clock time information, 800: data table, 812: pattern ID, 814: facility type, 816: basic pattern information, 820: fluctuation pattern, 830: fluctuation pattern, 900: data table, 912: basic information ID, 914: facility type, 916: calculation basic information, 922: calculation expression, 924: stay time, 926: area factor, 1000: data table, 1012: facility ID, 1014: facility type, 1016: area identification information, 1018: specification, 1022: the number of rooms, 1024: total floor area

What is claimed is:

1. A population estimation apparatus comprising:
 a log information obtaining unit which obtains log information in which one or more pieces of positional information and clock time information are associated, the one or more pieces of positional information indicating positions of one or more wireless terminals, respectively, and the clock time information indicating clock times at which the one or more pieces of positional information are obtained, respectively;
 a fluctuation pattern determination unit which determines, based on the log information, a population fluctuation pattern indicating temporal population fluctuations of a particular geographic range;
 a type determination unit which determines a type of a facility in the particular geographic range, with reference to basic pattern information in which a facility type and the population fluctuation pattern indicating temporal population fluctuations of the facility are associated, and based on the population fluctuation pattern determined by the fluctuation pattern determination unit; and
 an estimated value deriving unit which determines calculation basic information corresponding to the facility type determined by the type determination unit, with reference to calculation basic information for each facility type used for population movement estimation, to derive an estimated value of the population movement of the facility in the particular geographic range.

2. The population estimation apparatus according to claim 1, further comprising:
 a visitor count estimation unit which estimates, based on the log information, the number of visitors of the facility in the particular geographic range in a predetermined time period; and
 a basic information generation unit which generates the calculation basic information based on the number of visitors determined by the visitor count estimation unit.

3. The population estimation apparatus according to claim 1, further comprising a basic pattern generation unit which generates the basic pattern information based on the log information.

4. The population estimation apparatus according to claim 1, wherein
 the calculation basic information includes:
 first calculation basic information for each type of a steadily fluctuating facility, used for population movement estimation of the steadily fluctuating facility, the steadily fluctuating facility being a facility routinely visited by particular persons; and
 second calculation basic information for each type of a variably fluctuating facility, used for population movement estimation of the variably fluctuating facility, the variably fluctuating facility being a facility uncertainly visited by unidentified persons.

5. The population estimation apparatus according to claim 4, wherein the second calculation basic information includes a calculation expression defined by correlation between the number of visitors of the variably fluctuating facility and the number of cars parked in a parking lot of the variably fluctuating facility.

6. The population estimation apparatus according to claim 4, wherein the second calculation basic information includes a calculation expression defined by correlation between the number of visitors of the variably fluctuating facility and a capacity-related condition of the variably fluctuating facility.

7. The population estimation apparatus according to claim 1, wherein the estimated value deriving unit
 derives an estimated value of the population movement of the facility in the particular geographic range in a first time segment,
 extracts basic pattern information indicating a population fluctuation in each second time segment from among a plurality of pieces of basic pattern information corresponding to the facility type determined by the type determination unit, and derives an estimated value of the population movement of the facility in the particular geographic range in each second time segment, based on the extracted basic pattern information and the estimated value of the population movement in the first time segment.

8. The population estimation apparatus according to claim 7, wherein the calculation basic information further includes stay time information indicating a stay time per day of visitors for each facility type, and the estimated value deriving unit derives a fluctuating population potential which is an index value of a potential fluctuating population, based on the estimated value of the population movement of the facility in the particular geographic range in each second time segment and the stay time information.

9. The population estimation apparatus according to claim 1, wherein the estimated value deriving unit counts up the population movement of each facility in the particular geographic range to derive the estimated value of the population movement of a region which includes a plurality of particular geographic ranges.

10. A non-transitory computer-readable recording medium which records a program, wherein the program causes a computer to function as the population estimation apparatus according to claim 1.

11. A population estimation method comprising:

a log information obtaining step of obtaining log information in which one or more pieces of positional information and clock time information are associated, the one or more pieces of positional information indicating positions of one or more wireless terminals, respectively, and the clock time information indicating clock times at which the one or more pieces of positional information are obtained, respectively;

a fluctuation pattern determining step of determining, based on the log information, a population fluctuation pattern indicating temporal population fluctuations of a particular geographic range;

a type determining step of determining a type of a facility in the particular geographic range, with reference to basic pattern information in which a facility type and the population fluctuation pattern indicating temporal population fluctuations of the facility are associated, and based on the population fluctuation pattern determined by the fluctuation pattern determining step; and an estimated value deriving step of determining calculation basic information corresponding to the facility type determined in the type determining step, with reference to calculation basic information for each facility type used for population movement estimation, to derive an estimated value of the population movement of the facility in the particular geographic range.

* * * * *